ary Examiner—Richard E. Aegerter
Assistant Examiner—Richard R. Stearns
Attorney, Agent, or Firm—Woodhams, Blanchard and Flynn

United States Patent
Wiedenmann

[11] 3,914,870
[45] Oct. 28, 1975

[54] DEVICE FOR CHECKING THE RESPECTIVE ECCENTRICITY OF THE INNER AND THE OUTER SURFACES OF TUBES OR SLEEVES

[75] Inventor: Hans Wiedenmann, Vohringen, Germany

[73] Assignee: Wieland-Werke AG, Ulm, Germany

[22] Filed: Oct. 1, 1973

[21] Appl. No.: 402,332

[30] Foreign Application Priority Data
Oct. 11, 1972 Germany............................ 2249742

[52] U.S. Cl.............................. 33/174 Q; 33/178 E
[51] Int. Cl.²........................ G01B 5/25; G01B 7/31
[58] Field of Search ........... 33/174 Q, 178 R, 178 E

[56] References Cited
UNITED STATES PATENTS
1,329,456   2/1920   Carpenter ......................... 33/178 R
3,426,437   2/1969   Rebhun et al. ................... 33/174 Q
3,477,136   11/1969  Johnson ............................ 33/178 R FOREIGN PATENTS OR APPLICATIONS
551,356   2/1943   United Kingdom............... 33/178 R

[57] ABSTRACT

Device for checking concentricity of the inner and outer surfaces of tubular members. An inner and outer set of probes define two axes. Each probe is movable with respect to the respective centering axis. The three probes of each set, such as the inner set, engages the sample so that the axis of the sample coincides with the centerline of the inner set of three probes. The outer set of three probes is mounted on supporting substructures for the inner probes and each probe of the outer set is pivotal with respect thereto. The angular deviation of the outer set of probes with respect to the inner set of probes will indicate the eccentricity of the outer surface of the sample with respect to the inner surface thereof. Indicator means are attached to the inner and outer sets of probes to provide electrical or other indication of the relative positions thereof.

16 Claims, 3 Drawing Figures

DEVICE FOR CHECKING THE RESPECTIVE ECCENTRICITY OF THE INNER AND THE OUTER SURFACES OF TUBES OR SLEEVES

FIELD OF THE INVENTION

The invention relates to a device for checking the respective eccentricity of the inner and the outer surfaces of tubes or sleeves.

BACKGROUND OF THE INVENTION

Such a device is used to detect in tubes or sleeves, particularly those of circular cross section, deviations from exact concentricity of the inner and outer boundary circles. Deviations in the wall thickness of the sample from a nominal value will not influence the checking as long as these deviations remain the same over the entire circumference of the sample with respect to amount and direction. Also it is desirable to apply the same principle to the checking of workpieces having conical inner and/or outer surfaces. The checking operation should be carried out in as simple a manner as possible, praticularly in a manner to avoid rotary movements of the tubes or sleeves which are to be checked.

According to the invention this purpose is attained substantially by providing two sets of centering probes which are adjustable with respect to one another and with respect to their centering axes. The same can be engaged by the probes at its outer and at its inner surfaces at least three points on a circumferentially extending circle so that the centering axis of each set of centering probes extends through the center of the circumferential circle of the surface on which the centering probes engage the sample. Thus, the axes of the two sets of centering probes can be adjusted with respect to one another corresponding to the center misalignment of this circumferential circle. For indicating this respective adjusting of the centering axes there is provided an indicator which is connected to both sets of centering probes. As a result, the device according to the invention finds by scanning at each of at least three points the circle which is representative of the inner and outer circumference of the sample and the center misalignment of these two circles indicates in a direction-independent manner the eccentricity of the sample.

In detail the invention can be carried out in various ways. One possibility is that the two sets of centering probes can be guided together with always parallel centering axes and can be adjusted with respect to one another by appropriate guide means only transversely to their centering axes. This adjusting is then a measurement for the eccentricity of the inner and the outer surface of the sample. Because of the respective parallel guiding of the two centering probes, it is sufficient if the two sets of centering probes clamp the sample on the inner and on the outer surfaces each in only one single circumferential circle.

A different embodiment which is preferred within the scope of the invention is characterized in that one of the two sets of probes engage the sample in the inner or on the outer surface on at least two circumferential circles which lie parallel and spaced from one another, so that the axis of the sample coincides with the axis of the set of centering probes. The respectively other set of centering probe is supported swingably on the first set of centering probes so that it, with respect to its centering axis, can be inclined in all directions with respect to the one of the first set of centering probes. The angle of inclination of the two centering axes against one another, which angle is then adjusted during clamping of the tube, is a measurement of the eccentricity.

Both described embodiments of the invention permit a very simple construction of the indicator which is preferably characterized in that it consists of an indicator rod which is at least approximately parallel to the centering axes of the probes, which indicator rod is connected at two connecting points which are spaced lengthwise of the rod from one another tiltably with respect to each one of the three probes in a set, and the tilting angle of which can be measured in relation to a reference piece which is rigidly connected to one of the two centering probes. The relative eccentricity of the two surfaces of the sample can be determined directly on the angle of inclination of the indicator rod. Various designs of centering probes are possible provided only that they indeed clamp the sample while centered. Thus all of the contact means on one rocking lever grip the sample described in reference to the centering axes in equal adjusting paths. This can be accomplished in a simple manner by suitable wedge or lever means arranged to couple the individual contact means of the centering probes in their adjusting movements. Thus a very simple and therefore preferred set of centering probes within the scope of the invention for the inner surface of the sample is comprised of a hollow cylinder and contact means which are arranged spaced at equal distances in the cylinder wall longitudinally of one or more parallel circumferential circles, are radially movably guided and are adjustable radially each for an adjusting path by an adjusting piece movable in the hollow cylinder, which adjusting path has the same size for all contact means on one circumferential circle. If the clamping of the sample is intended to occur axially parallel to the centering axis of the probes, the contact means can be arranged easily on several circumferential circles. However, the contact means of different circumferential circles can carry out various adjusting movements equal, however, for each circumferential circle within itself so that with such a centering probes it is, for example, also possible to clamp and check conically tapered tubes or sleeves. The adjusting piece may be an adjusting rod which is guided axially in the hollow cylinder, which adjusting rod adjusts the contact means through levers or adjusting cones. Thus, only the exact construction of the levers or adjusting cones is important in order to realize for all contact means on one circumferential circle the desired equal adjusting paths.

If the probes for the inner set of three inner surface of the sample are so constructed that the engagement occurs on several circumferential circles, and the axis of the clamped sample coincides with the axis of the set of centering probes, then according to the invention one embodiment will in a very simple manner provide set of centering probes for the outer surface which consists of a ring concentric with the probes for the inner surface and rocking levers which are supported on said ring, which rocking levers are arranged at an equal distance from one another longitudinally of the ring circumference and are pivotable about support axes which are tangential to the ring. Said levers further have contact means for clamping of the outer surface and for indicating their pivotal position when a clamped outer surface is connected to the indicator. The ring which supports said rocking levers is advantageously connected to the hollow cylinder which comprises the probes for the inner surface of the sample, whereby to obtain an exactly concentric arrangement of the ring and said hollow cylinder in order to minimize the possibility of errors in the devices. Usually, the arrangement will be made so that the rocking levers are constructed with two arms, which rocking levers carry at the end of the one arm the contact means and radially engage with the end of the other arm the indicator rod through contact means, said indicator rod being supported at one end universally tiltably in the line of the probes for the inner surface. In particular in such an advantageous embodiment it is possible to utilize the indicator rod at the same time as an adjusting piece for the rocking levers. Additionally the indicator rod is provided with a cone against which the rocking levers abut and with a piston which is constructed spherically on the bearing surface, which piston is guided for axial movement without influencing the tiltability of the indicator rod in a hollow cylinder which is concentric to the spindle of the centering probes for the inner surface. The rocking force can then according to a further suggestion of the invention be produced in a very simple manner by arranging the hollow cylinder of the probes for the inner surface and the hollow cylinder which guides the piston of the indicator rod concentrically of each other and thereby form a common pressure chamber for a pneumatic or hydraulic operating medium. The indicator rod can thereby be adjusted through its spherical piston and the adjusting rod of the probes for the inner surface through a special piston each against the force of return springs for tensioning the two sets of centering probes. According to a preferred embodiment it is possible to use instead of the pneumatic or hydraulic operating medium a mechanical spring which during moving in of the sample exerts no force or only a small force from the adjusting cone onto the piston. During the checking, the spring force is increased by a device acting from outside so that a force is applied on the adjusting cone and the piston, which force corresponds to the pressure medium.

Moreover it is advisable that the contact means of the probes for the outer surface and the contact means of a circumferential circle of the probes for the inner surface lie in the same radial plane in order to avoid the possibility that bending of the sample longitudinally of its axis can during checking simulate an eccentricity of the two surfaces. In order moreover to prevent deviations from the exact circular shape of the sample from simulating an eccentricity between inner and outer cross section, it is advisable that the contact means of the probes for the outer surface and the contact means of the probes for the inner surface lie each in the same axial planes. As a result this means that the contact means of the two probes of each set should lie radially opposite one another in relation to the wall of the sample.

The reference piece can advantageously be a hollow cylinder which has longitudinal slots for passage of the rocking levers, which furthermore concentrically surrounds the indicator rod and is arranged both concentrically to the guide cylinder of the indicator rod and concentrically to the hollow cylinder of the centering probes for the inner surface. Particularly the guide cylinder and the ring supporting the rocking levers are connected in a single integral unit with said hollow cylinder. In order to obtain in a simple manner an electrical indication upon exceeding of a selected tolerance by the eccentricity being checked, it is within the scope of the invention to equip the indicator rod at the free end with a contact head and the reference piece with an oppositely positioned, electrically insulating contact ring which can be secured interchangeably on the reference piece. The contact head and the contact ring can be connected through an electrical indicating circuit in a simple manner so that when the contact head contacts the contact ring a suitable signal, for example of an optical and/or acoustical type, is produced.

The technical advance which is achieved with the invention consists substantially in that with the device of the invention it is possible in a particularly simple manner to measure relative eccentricities of the inner and outer surface of circular sleeves or tubes without requiring that the sample be moved relative to the device. Deviations of the sample from circularity or bending along its axis can by a suitable design of the device be easily eliminated from consideration so that they do not interfere with the accuracy of the measurement. Moreover, the device is also readily suitable for checking of conical tube pieces or sleeves.

BRIEF DESCRIPTION OF THE DRAWINGS

The invention will be explained more in detail hereinafter in connection with one exemplary embodiment illustrated in the drawings in which.

DETAILED DESCRIPTION

Figure 1:
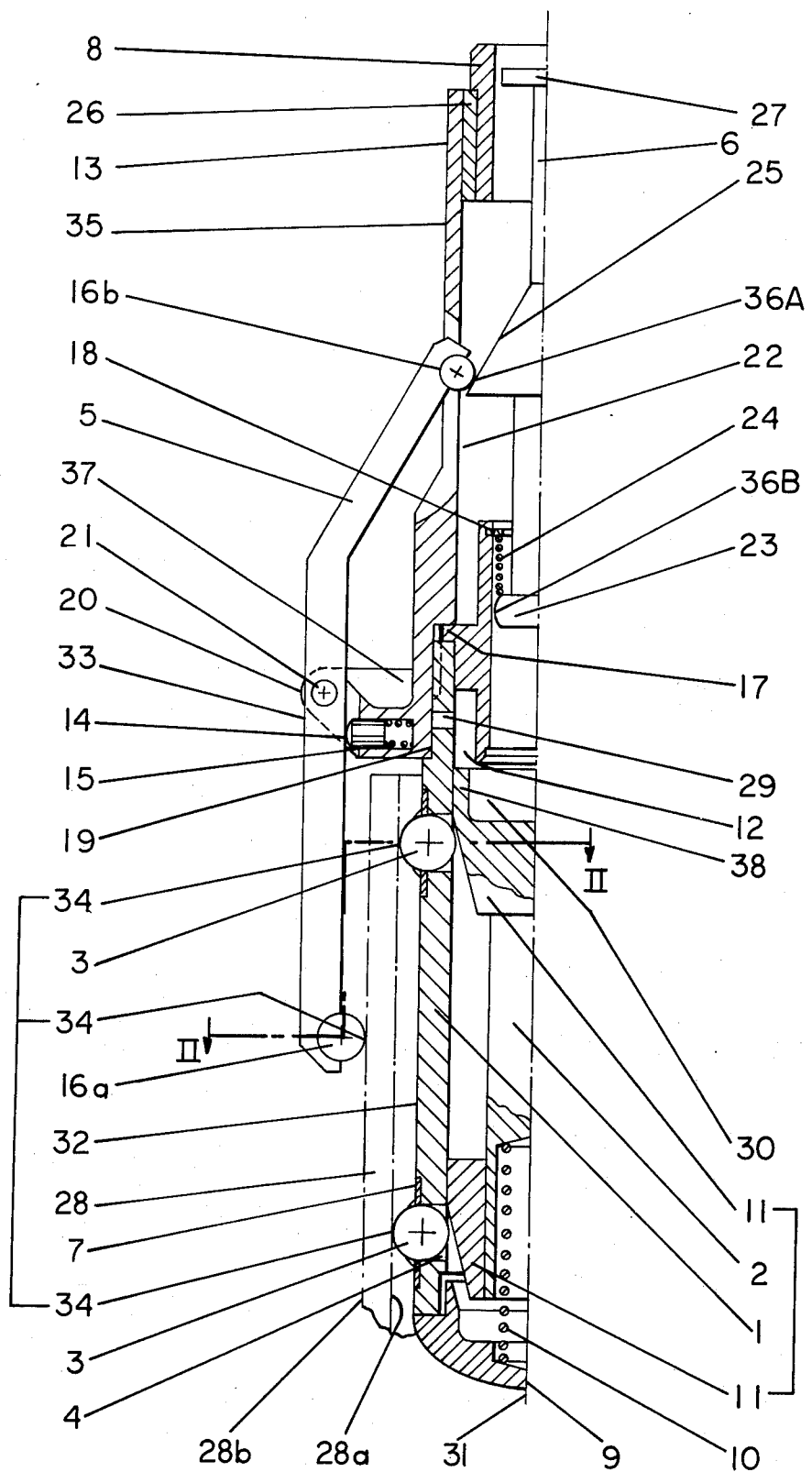
FIG. 1 illustrates one-half of an axial cross-sectional view of a device according to the invention.
Figure 2:
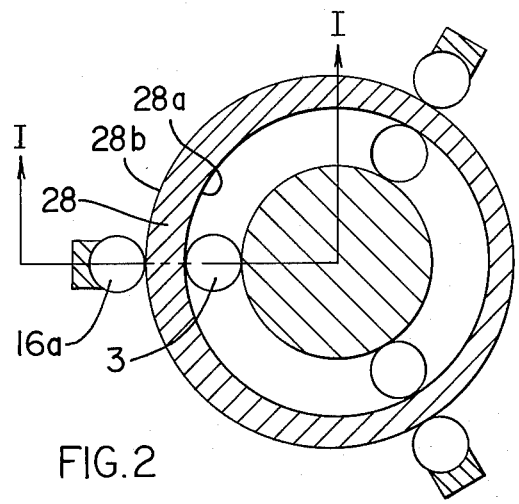
FIG. 2 is a full sectional view of the device taken along the line II—II of FIG. 1.
Figure 3:
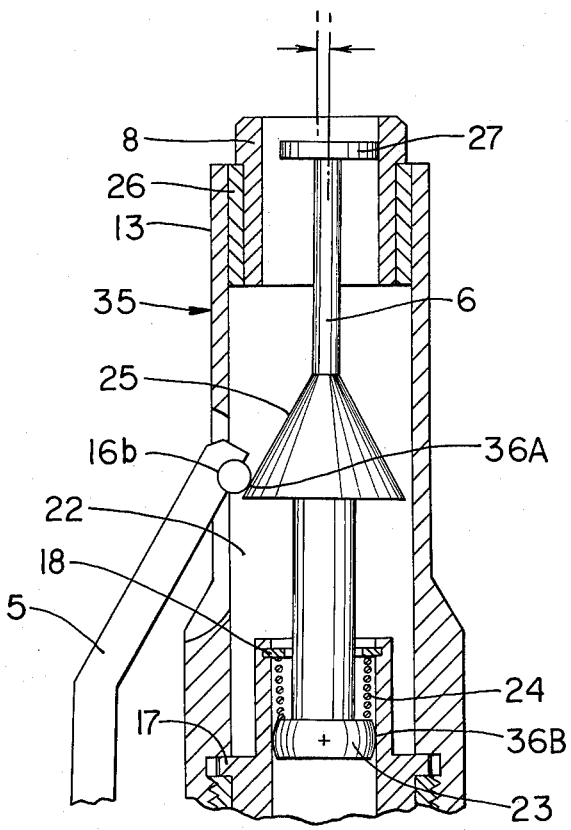
FIG. 3 is an enlarged fragmentary sectional view of the indicator.

The device which is illustrated in the drawing is used for checking the reciprocal eccentricity of the inner and outer surface 28a, 28b of a sample 28, such as, as shown in FIG. 1, a circular tube or sleeve. For this purpose the device consists substantially three sets of probes which can be adjusted with respect to one another and with respect to their centering axes, both axes being coincident and indicated at 31. One of said probes is identified generally with reference numeral 32 and the second one generally with reference numeral 33. The sample 28 can be clamped into the three sets of two probes by its outer and its inner surfaces at least at three points of a circumferential circle although in FIG. 1 only one of the sets of probes is shown at 34. The centering axis 31 of each of the centering probes 32, 33 extends through the center of the circumferential circle of the surface 28a, 28b, on which the probes clamp the sample 28, whereby the centering axes 31 of the probes 34 can be adjusted with respect to one another in response to any possible misalignment of the centers of these circumferential circles. This means in the drawing that the centering axis of the centering probes 32 extends through the center of the inner surface 28a of the sample 28, while the axis of the centering probes 33 extends through the center of the outer surface 28b of the sample. The reciprocal adjustment of the centering axes is indicated by an indicator which in the drawing is generally identified with reference numeral 35, which indicator is for this purpose connected to both probes 32, 33. In the exemplary embodiment the probes 32 clamps the sample 28 at the inner surface 28a by engagement at and on two circles which lie parallel to and spaced from one another. The axis of the sample 28 coincides therefore with the centering axis 31 of said probes 32. The probes 33 which in contrast clamps the sample 28 on its outer surface 28b is supported for pivoting on the first probes 32 so that it can be inclined in all directions with respect to its centering axis and relative to that of the first centering probes 32. In the illustration of the drawing, no center misalignment was assumed for the inner and the outer surfaces 28a, 28b of the sample 28. Therefore the centering axes 31 of both centering probes 32, 33 coincide and correspond also with the axes of the inner and the outer surface of the sample.

The indicator 35 consists of an indicator rod 6 which is at least approximately parallel to the centering axes 31 of the centering probes 32, 33. This indicator rod 6 is connected in a universal tilting relationship to one of the pairs of probes, here the probe 33, at connecting points 36A and pivotally connected to the other probe, here probe 32, at connecting point 36B, which connecting points 36A and 36B are spaced from one another longitudinally of the rod 6. The tilting angle of the indicator rod 6 can be measured with reference to a reference piece which is generally identified by numeral 13 and which is rigidly connected to the centering probes 32 for the inner surface 28a of the sample 28.

Individually the probes 32 for the inner surface 28a consists of a hollow cylinder 1 and of contact means 3 which comprise steel balls or the like, and which contact means are arranged in openings 4 in the cylinder wall lengthwise of the above-mentioned parallel circumferential circles, each at an equal distance from one another and are guided for radial movement. They are prevented from falling out of their guide means by plastic sleeves, spring or the like, which are identified by numeral 7. They are each adjustable radially in an adjusting path by an adjusting piece 2 which is movable in the hollow cylinder 1, which adjusting path has the same size for all contact means 3 of one circumferential circle. The adjusting piece 2 is an adjusting rod which is axially guided in the hollow cylinder 1 and adjusts the contact means 3 through adjusting cones 11. The exactly centered guide of the adjusting piece 2 and the correspondingly exactly centered arrangement of the adjusting cones 11 is a condition for the desired exact concentric clamping of the sample 28 at its inner surface 28a. The centering probes 33 for the outer surface 28b consists, contrastingly, of a ring 37 which is concentric with the probes 32 for the inner surface 28a and a plurality of rocking levers which are supported on said ring 37. The rocking levers 5 are arranged equally spaced from one another around the ring circumference and are pivotable about support pins 21 in bearings 20, the axes of said support pins being positioned tangentially to a theoretical circle through the support pins. The rocking levers also carry for example, contact means 16a which comprise steel balls for clamping the outer surface 28b fo the sample 28 and are connected to the indicator 35 for indicating their pivotal position at a clamped outer surface. In the two-arm construction of the rocking levers 5, which construction was selected in the illustrative embodiment, the contact means 16a are arranged at the end of the one arm, while the other end of the lever arm rests radially through slide means 16b on the indicator rod 6. Said slide means, for example, also include steel balls or steel rollers. The indicator rod 6 itself is supported at the end, which is the lower end in the drawing, pivotally on the line of the axis 31 of the centering probes 32 for the inner surface 28a. This exact centered positioning of the indicator rod 6 and the exact centering of the ring 37 carrying the rocking levers 5 in relation to the hollow cylinder 1 of the centering probes 32 for the inner surface 28a of the sample 28 further contribute to the precision of the described measuring device.

The figure illustrates an exemplary embodiment in which the indicator rod 6 also comprises an adjusting peice for the rocking levers 5 and is provided with a cone 25 against which rests the rocking levers with the slide means 16b. Of course this cone 25 must also be exactly concentric in relation to the axis of the indicator rod 6 in order to assure during the axial shifting of the indicator rod 6 the even pivoting of the rocking levers 5. The indicator rod 6 is provided at its lower end with a piston 23 which is shaped spherically at 36 on the bearing surface, and which piston, without effecting the tiltability of the indicator rod 6, is axially movably guided in a hollow cylinder 12 concentric to the axis 31 of the centering probes 32 for the inner surface 28a. The hollow cylinder 1 of the probes 32 for the inner surface 28a and the hollow cylinder 12 guiding the piston 23 of the indicator rod 6 are arranged concentrically and form together a pressure chamber 30 for a pneumatic or hydraulic operating medium, which pressure chamber is accessible through a control opening 29. If the pressure chamber 30 is filled with the operating medium under pressure, then the indicator rod 6 is adjusted through its spherical piston 23 and the adjusting piece 2 of the probes 32 for the inner surface 28a through an independent piston 38 against the force of return springs 10, 24 for urging the two probes 32, 33 of each set and the indicator rod 6 upwardly in the drawing and the adjusting piece 2 of the probes 32 downwardly. Instead of the pneumatic or hydraulic operating medium utilized in the preferred embodiment of the invention, a mechanical spring may be used which during moving in of the sample 28 does not apply any force or only a small force from the adjusting cone 11 onto the piston 23. During the checking, the spring force is increased by a device acting from outside to cause the adjusting cone 11 and the piston 23 to apply a force corresponding to the pressure medium. The return spring 24 for the indicator rod 6 is supported against a snap ring 18 and the return spring 10 for the adjusting piece 2 is supported on a cap 9 which closes off the hollow cylinder 1 at the lower end thereof. Of course, it is possible to provide instead of the compression springs 10, 24, shown tension springs which are arranged in a suitable manner.

As the drawing further illustrates, the contact means 16a of the probes 33 for the outer surface 28b and the contact means 3 of a circumferential circle of the centering probes 32 for the inner surface 28a lie in the same axial plane which prevents deviations of the sample 28 from the exact circle from appearing as a reciprocal eccentricity of the two surfaces 28a, 28b of the sample. If, moreover, in contrast to the illustrated exemplary embodiment, the contact means 16a of the centering probes 33 for the outer surface 28b and the contact means 3 of a circumferential circle of the centering probes 32 for the inner surface 28a lie in the same radial plane, bending of the sample in the axial direction are also not able to appear as an eccentricity.

In the exemplary embodiment the reference piece 13 is a hollow cylinder which has longitudinal slots 22 through which extend the rocking levers 5. It surrounds concentrically the indicator rod 6 and is arranged both concentrically to the guide cylinder 12 of the indicator rod 6 and also concentrically to the hollow cylinder 1 of the centering probes 32 for the inner surface 28a. The apparatus made thus provides that said hollow cylinder 1, the guide cylinder 12 and the ring which supports the rocking levers 5, are, if not made integrally, assembled with exactly concentrically mating surfaces 19 and mating flanges 17. The drawing further shows that the indicator rod 6 has at its free end a contact head 27, the reference piece 13 and an opposed contact ring 8 which is electrically insulated by a plastic sleeve 26 or the like. Said contact ring can be secured interchangeably on the reference piece 13. If then the reference piece 13 and the contact ring 8 are connected to one circuit, the contact of the contact head 27 on the contact ring 8 can be used as switch for releasing a suitable acoustic or optic signal. By using contact rings 8 of various cross sections it is possible in a simple manner to change the tolerance for the eccentricity check.

To facilitate the mounting of the described device onto the sample 28 and to avoid damage to the contact means 16a, the rocking levers 5 are urged outwardly by pins 14 which are backed by the pressure springs 15. This is easily accomplished because the pressure chamber 30 is at first not charged with the operating medium and therefore the indicator rod 6 is moved downwardly in the drawing by its return spring 24.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. A device for checking the relative eccentricity between the inner and outer surfaces of an elongated hollow member, comprising:
    a frame defining a first axis;
    two sets of probes mounted on said frame, one of said sets of probes including first movable contact means for simultaneously radially engaging one of said inner and outer surfaces to locate a second axis of said one of said inner and outer surfaces coaxial with said first axis of said frame, the other of said sets of probes including second movable contact means for radially moving into engagement with the other of said inner and outer surfaces to locate a third axis of said other of said inner and outer surfaces relative to said axis of said frame; and
    indicator means operatively connected to said other set of probes for indicating the relative displacement between said third axis from said coaxial first and second axes to thereby indicate the relative eccentricity between said inner and outer surfaces.

2. The device according to claim 1, wherein said first contact means on said probes of said one set contact said one of said inner and outer surfaces of said elongated hollow member at locations through which a pair of spaced and parallel planes extend, said second contact means on said probes of said other set contacting said other of said inner and outer surfaces at locations through which another plane extends, said another plane being parallel to said pair of parallel planes.

3. The device according to claim 1, wherein said indicator means comprises an elongated indicator rod extending generally parallel to said first axis, said indicator rod being pivotally connected to said frame by means defining a universal pivot connection, said indicator rod engaging said other set of said probes at a location spaced from said universal pivot connection and said second contact means.

4. The device according to claim 3, wherein said other set of probes comprise a plurality of two arm rocking levers pivotally secured to said frame for said one set of said probes intermediate the ends of said two arm rocking levers, one arm having said second contact means thereon, the other arm engaging said indicator rod.

5. The device according to claim 4, wherein said first contact means engage said inner surface and said second contact means engage said outer surface.

6. The device according to claim 4, wherein said indicator means further includes means defining a reference piece secured to said frame for said one set of said probes, the movement of said indicator rod relative to said reference piece, caused by said contact means engaging a nonconcentric surface, indicating said magnitude of eccentricity between said inner and outer surfaces.

7. The device according to claim 4, wherein said frame includes an annular ring, each of said two arm rocking levers being pivotally secured to said annular ring at equally spaced locations, the pivot axes for each of said rocking levers being tangent to a circle whose center is coincident with said axis of said frame.

8. The device according to claim 4, wherein said indicator means includes support means for supporting said indicator rod for movement axially and concentrically of said frame, said indicator rod having a conical surface thereon engaging said other arm of said rocking levers.

9. The device according to claim 3, wherein said frame comprises a hollow sleeve, the axis of which defines said axis of said frame and having said first contact means mounted thereon, said first contact means being equally spaced around the periphery of said sleeve and contained in a pair of spaced and parallel planes.

10. The device according to claim 9, wherein said first contact means includes contact members and adjusting means for adjusting said contact members equally radially of said hollow sleeve.

11. The device according to claim 10, wherein said adjusting means includes means defining a reciprocal, movable inclined surface engaging said contact members, said inclined surface being movable axially of said hollow sleeve to move said contact members radially of said hollow sleeve and into engagement with the internal surface of said opening in said elongated hollow member.

12. The device according to claim 11, wherein the axis of said hollow sleeve passes through the center of said universal pivot connection; and
    wherein said indicator means includes support means for supporting said indicator rod for movement axially of said hollow sleeve.

13. The device according to claim 12, wherein said support means also supports said adjusting means for said reciprocal movement, said hollow sleeve further having means therein defining a chamber between said indicator rod and said adjusting means and inlet passageway means to said chamber to permit a pressurization of said chamber and a resulting movement of said indicator rod and said adjusting means.

14. The device according to claim 13, including resilient means for returning said indicator rod and said adjusting means to an initial position prior to pressurization of said chamber means.

15. The device according to claim 3, wherein said indicator means further includes means defining a reference piece secured to said frame, the movement of said indicator rod relative to said reference piece, caused by said second contact means engaging a nonconcentric surface of said hollow member, indicating said magnitude of eccentricity between said inner and outer surface; and wherein said probes of said other set comprise a plurality of two arm rocking levers pivotally secured to said frame intermediate the ends thereof, one arm having said second contact means thereon, the other arm engaging said indicator rod; and wherein said reference piece is a hollow cylindrical member encircling said indicator rod and having a plurality of elongated slots therein each being adapted to receive said other arms of said rocking levers therethrough to permit said other arms to engage said indicator rod.

16. The device according to claim 15, wherein said indicator rod has at its free end remote from said universal pivot connection an enlarged contact head; and wherein said reference piece has an electrical contact ring connected thereto and adapted to be engaged by said enlarged head.

* * * * *

UNITED STATES PATENT OFFICE
CERTIFICATE OF CORRECTION

Patent No. 3,914,870     Dated October 28, 1975

Inventor(s) Hans Wiedenmann

It is certified that error appears in the above-identified patent and that said Letters Patent are hereby corrected as shown below:

Column 8, line 27; after "said" (second occurrence) insert ---second---.

line 41; change "arm" to ---arms---.

Column 10, line 1; change "face" to ---faces---.

Signed and Sealed this second Day of March 1976

[SEAL]

Attest:

RUTH C. MASON
*Attesting Officer*

C. MARSHALL DANN
*Commissioner of Patents and Trademarks*